June 17, 1941.  H. PAULL  2,246,381
CONTROL MEANS FOR MOVING PUPPETS
Filed March 4, 1940
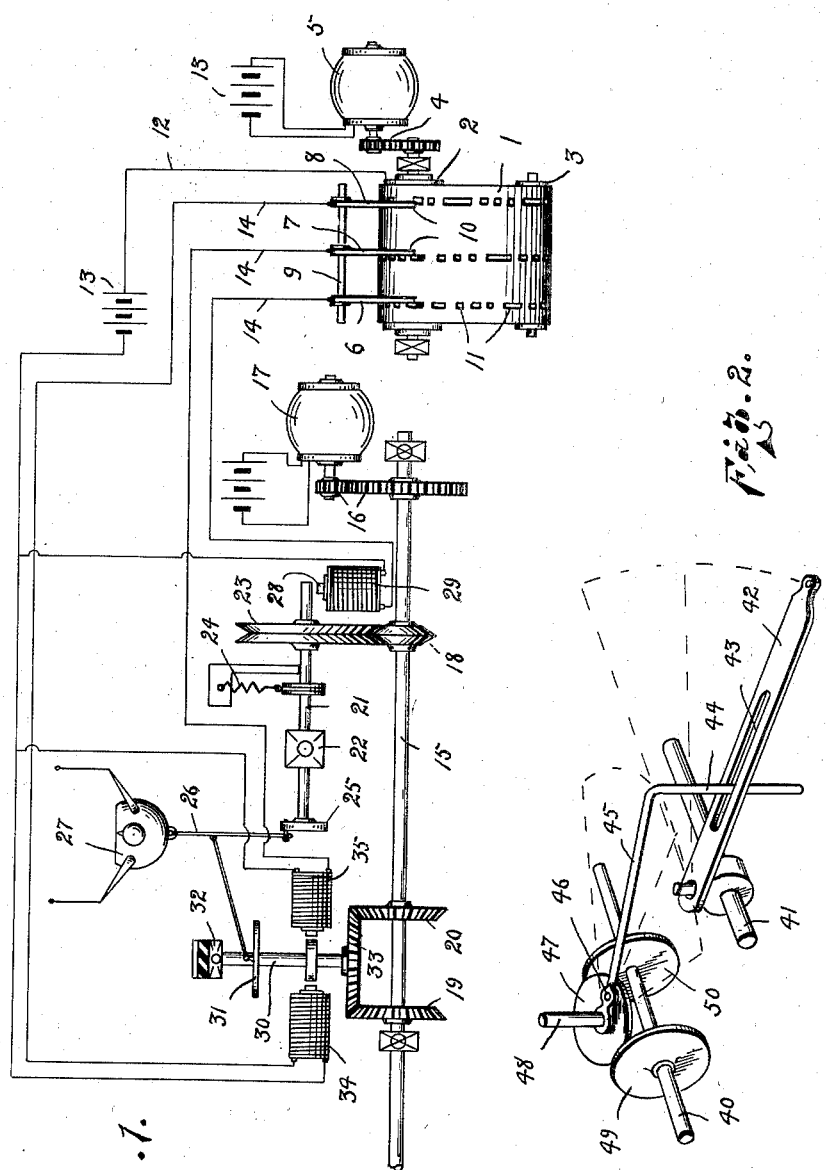
INVENTOR.
Henry Paull.
BY Geo. Stevens.
ATTORNEY.

Patented June 17, 1941

2,246,381

UNITED STATES PATENT OFFICE 2,246,381

CONTROL MEANS FOR MOVING PUPPETS

Henry Paull, Duluth, Minn.

Application March 4, 1940, Serial No. 322,265

5 Claims. (Cl. 46—126)

This invention relates to power transmission means and has special reference to such a device particularly adapted for use in the transmission of predetermined action of puppets, marionettes, or the like.

The principal object of the invention is to provide simple means for intermittently transmitting power and action from a relatively continuously operated power element.

Another object is to provide such means controlled automatically by the action of a perforated belt through the perforations of which electric contact is made for the control of the operating mechanism.

Another object is to provide means whereby a number of puppets or other devices may simultaneously, intermittently, or alternately operated from a single primary power unit.

Other objects and advantages of the invention will appear in the following description thereof.

Referring now to the accompanying drawing, forming part of this application, and wherein like reference characters indicate like parts:

Figure 1 is a diagrammatic plan view of one practical embodiment of the invention.

Figure 2 is a similar view of a modified form of means for accomplishing universal movement.

The utilization of a perforated belt for making and breaking an electric circuit is known to be old, therefore a detailed description of the same is deemed non-essential, other than that I represents such a belt as being mounted upon a drive roller 2 and an idler roller 3 spaced therefrom, the former being driven as by a suitable chain of gears 4, the pinion of which is driven as by the motor illustrated at 5.

For the purpose of illustrating the invention, it is deemed sufficient in this diagram to show but three contact elements 6, 7 and 8, as pivotally carried upon a shaft 9. These arms each carry a contact disc indicated at 10 for intermittent engagement with the roller 2 through the perforations or openings 11 in the belt 1 as the latter is revolved about the roller 2. This roller is shown as connected as by the wire 12 to the battery 13 or other suitable source of electric energy, while each of the arms 6, 7 and 8 has its individual wire 14 directly connected to the other side of the electric source of energy, and this will be described later.

A relatively continuously rotated shaft is illustrated at 15, it being driven as by a set of gears 16 operated by a motor 17 for example. This shaft 15 carries a driving friction disc 18 as well as two spaced similar discs 19 and 20, the latter being, for convenience in illustration, shown as spaced some distance from the driving disc 18, though such spacing and exact arrangement is not deemed essential to the instant invention. A countershaft 21 is not only rotatably mounted but also pivotally supported so that it may be slightly adjusted pivotally, and such a bearing for this type of mounting is diagrammatically illustrated at 22. This shaft carries adjacent one end the friction disc 23 normally spaced but a short distance from engagement with the disc 18 on the shaft 15 and is shown as thus held by a suitable contractile spring, for example, illustrated at 24. At the other end of this shaft is fixed a disc or crank arm as preferred, illustrated at 25, and to which is attached one end of the rod or pitman 26, and the other end of said pitman 26 being illustrated as connected with the puppet 27, or, as is obvious, to any movable portion of same, for instance an arm or leg.

It is to be noted that the shaft 21 extends some distance beyond the disc 23 and has closely mounted thereto the protruding core 28 of the electro-magnetic coil 29, the operative wires of which lead to the opposite terminals of the power unit 13, thus subjecting the action of such magnet to the making and breaking of the electric energy through the operation of its respective contact arm 6. By this means it is obvious that as electric contact is made through the arm 6 by its roller 10 engaging the roller 2, engaging the roller 9 through one of the perforations 11 in the belt 1, the shaft 21 will be drawn towards the magnet 29 and thus engage the friction disc 23 with the driving disc 18, and thereby action is imparted to that part of the puppet to which the pitman 26 is attached, and of course said action will be controlled by the extent and area of the perforations in the belt 1.

The discs 19 and 20 are also designed to convey action in a like manner to the puppet 27 or portions thereof and for simplicity in this illustration I have shown the pivotally and rotatably mounted countershaft 30 as carrying a disc or crank 31 connected to the pitman 26, though obviously it may be connected independently to some other portion of the puppet, but in no basic manner differing materially from that illustrated. This shaft is illustrated as being pivotally mounted as at 32 and normally held free from active engagement with either of the discs 19 and 20, that is by the disc 33 normally not engaging either of same, while upon opposite sides of this free end of the shaft 30 are mounted the electromagnets 34 and 35 which function in exactly the same manner as the electro-magnet 29 when their respective arms 7 and 8 are caused to make or break the circuits controlling same, the action of which is deemed quite obvious from the diagram.

Furthermore it is seen by this arrangement of power transmission discs that when the disc 33 is drawn towards the disc 20 and engaging same the shaft 30 will be rotated in one direction, while when the disc 33 is made to contact the disc 19 the shaft 30 will be rotated in the opposite direction. Thus when quick reverse action is desired upon portions of the puppet and the perforations 11 in the belt 1 are properly arranged, the shaft 30 may impart but slight back and forth lateral motion of the pitman 26; this being the specific arrangement illustrated.

Also it is to be understood that the utilization of the electric control countershafts in this manner permits of any desired number of puppets being operated from the same continuously operated shaft 15 by merely duplicating the assembly here shown, and such puppets may be made to function in pairs, individually, or otherwise as desired.

In the modified form illustrated in Figure 2, 40 represents the main power transmission shaft and 41 a countershaft for pivotal support of the puppet operating lever 42. This lever is provided with a slot 43 longitudinally thereof into which the depending portion 44 of the lever 45 is mounted, for lateral movement of the lever 42 but still permitting of its being at any angle desired in respect to its mounting upon the shaft 41. The opposite end of the lever 45 is illustrated as being fixed at 46 to the disc 47 mounted upon the countershaft 48, which may be alternately engageable with the driving discs 49 and 50 on the power transmission shaft 40, similar to that illustrated by the elements indicated at 19, 20 and 33 in Figure 1 of the drawing.

It is obvious that a sound track could be added to the side of the perforated belt to actuate sound equipment in synchronism with the action of the puppets.

Having thus described my invention, what I claim and desire to secure by Letters Patent, is:

1. In a mechanical puppet operating device, a puppet having a plurality of movable parts, a relatively continuously operating element, separate independent means each connected to a movable part of said puppet and engageable with said operating element, an electric circuit for control of each of said independent means, and means for selective control of said circuits whereby to engage said independent means with said operating element at predetermined times.

2. In a mechanical puppet operating device, a puppet having a plurality of movable parts, a relatively continuously operative power supply element, a plurality of independent transmission means each connected to a movable part of said puppet and selectively engageable with said power supply element, and means including a perforated belt for controlling the duration of engagement of said transmission means with said power supply element.

3. In a puppet operating device, a puppet having a plurality of movable parts, a relatively continuously operative power supply element, a plurality of independent transmission means each connected with a movable part of said puppet and selectively engageable with said power supply element, electro-magnetically controlled means for intermittently engaging said transmission means with said power supply element, and a perforated belt for making and breaking a circuit to said electro-magnetically controlled means.

4. In a puppet operating device for mechanically operating a puppet having a plurality of movable parts, comprising in combination a power shaft, a countershaft, an arm reciprocable by said countershaft and pivotally attached thereto and at its free end attached to a movable part of said puppet, and means operated directly by said power shaft and connected with said arm for imparting lateral motion to same irrespective of the angle thereof to said countershaft.

5. In a mechanical puppet operating device, a puppet having a plurality of movable parts, a relatively continuously operating element, separate independent means each connected to a movable part of said puppet and engageable with said operating element, means for the control of each of said independent means, and means for selective control of said control means whereby to engage said independent means with said operating element at predetermined times.

HENRY PAULL.